March 4, 1924.  1,485,403

C. F. MACDONALD ET AL

ROLLING AND SEVERING MACHINE FOR HOG SIDES

Filed Oct. 27, 1923    3 Sheets-Sheet 1

Witness
Martin H. Olsen.

Inventor
Clinton F. Macdonald
Harry H. McKee
By Rummler & Rummler
Attys

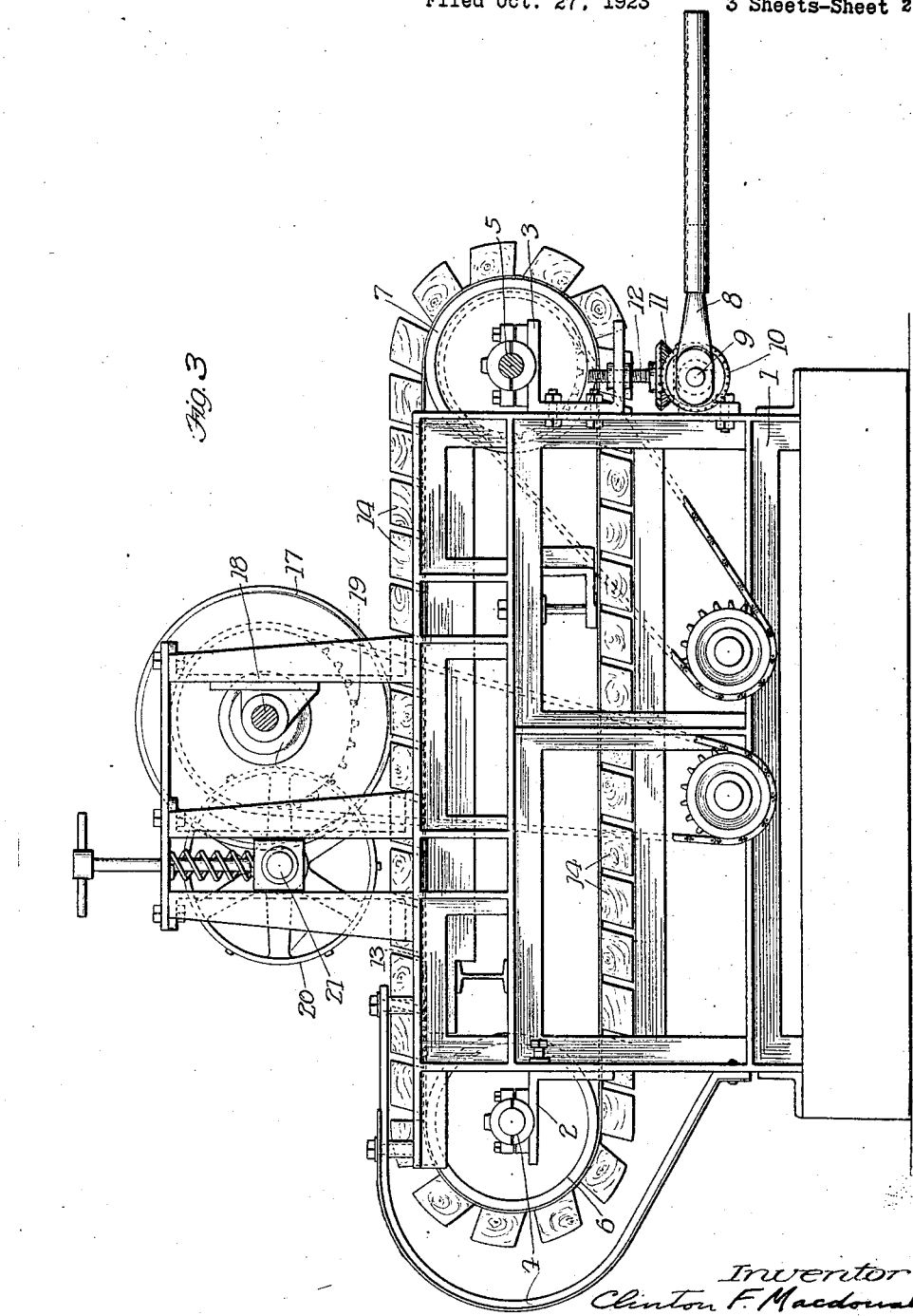

March 4, 1924.
C. F. MACDONALD ET AL
1,485,403
ROLLING AND SEVERING MACHINE FOR HOG SIDES
Filed Oct. 27, 1923   3 Sheets-Sheet 3
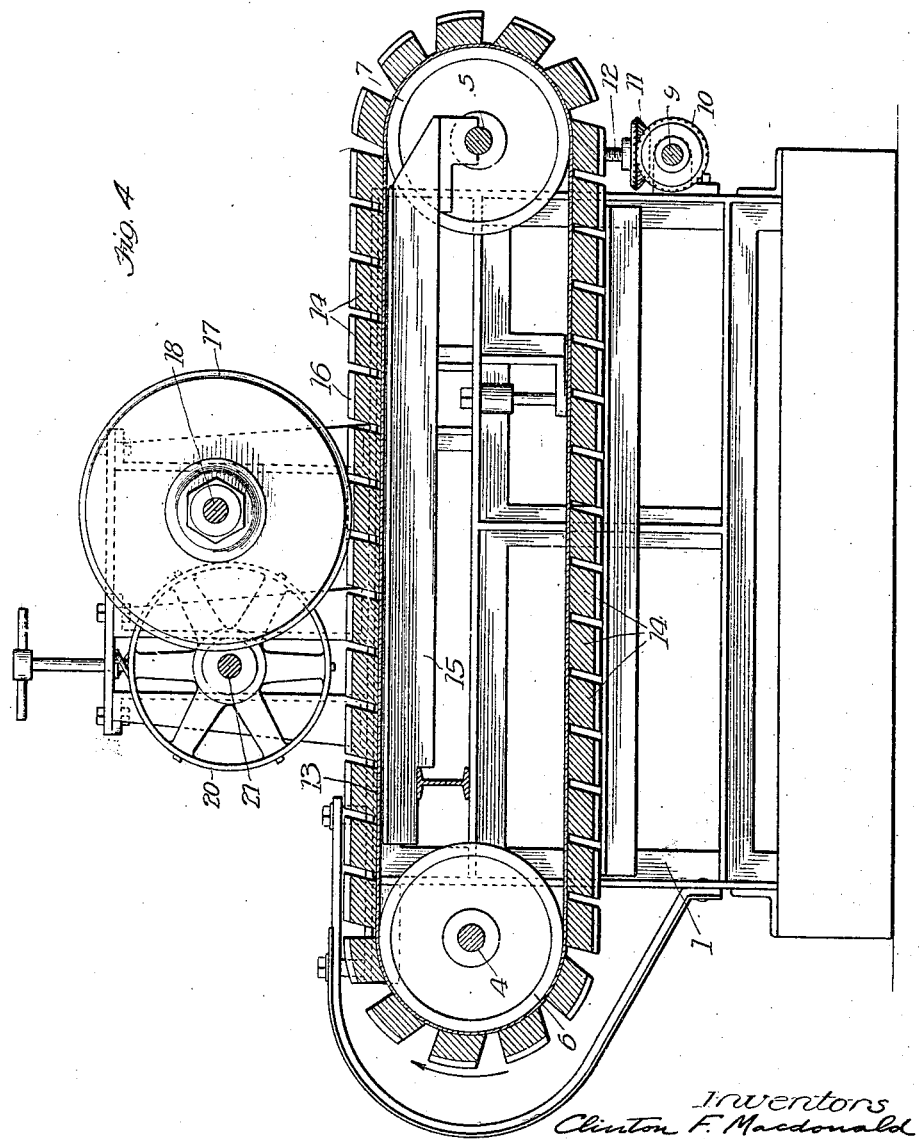

Patented Mar. 4, 1924.

1,485,403

UNITED STATES PATENT OFFICE.

CLINTON F. MacDONALD AND HARRY H. McKEE, OF ST. PAUL, MINNESOTA, ASSIGNORS TO SWIFT & CO., OF CHICAGO, ILLINOIS, A CORPORATION OF ILLINOIS.

ROLLING AND SEVERING MACHINE FOR HOG SIDES.

Application filed October 27, 1923. Serial No. 671,169.

*To all whom it may concern:*

Be it known that we, CLINTON F. MACDONALD and HARRY H. MCKEE, citizens of the United States of America and residents of St. Paul, in the county of Ramsey and State of Minnesota, have invented a new and useful Improvement in Rolling and Severing Machines for Hog Sides, of which the following is a specification.

This invention relates to machines for rolling or pressing the sides of hogs and at the same time removing the fat backs therefrom. Heretofore these operations have been separately performed at considerable loss of time and labor without equaling the quality of work performed by the present machine.

In the preparation of the sides of hogs for market, after being chilled and the loin, shoulders and hams have been removed, the sides are either rolled or pressed to flatten out the belly or bacon part of the sides and to bring the sides into more convenient form for separating the fat backs from the belly. The fat backs are then manually severed from the sides. The severing is not always done as accurately and straightly as desired, and also when the sides pass through the rolls, due to the width of the rolls, the back is sometimes cracked.

The purpose of the present invention is to provide means for rapidly pressing and severing the sides to avoid manual labor and to effect a more uniform and uninjured product.

The purposes of the invention are accomplished by the machine shown in the accompanying drawing in which:—

Figure 1:
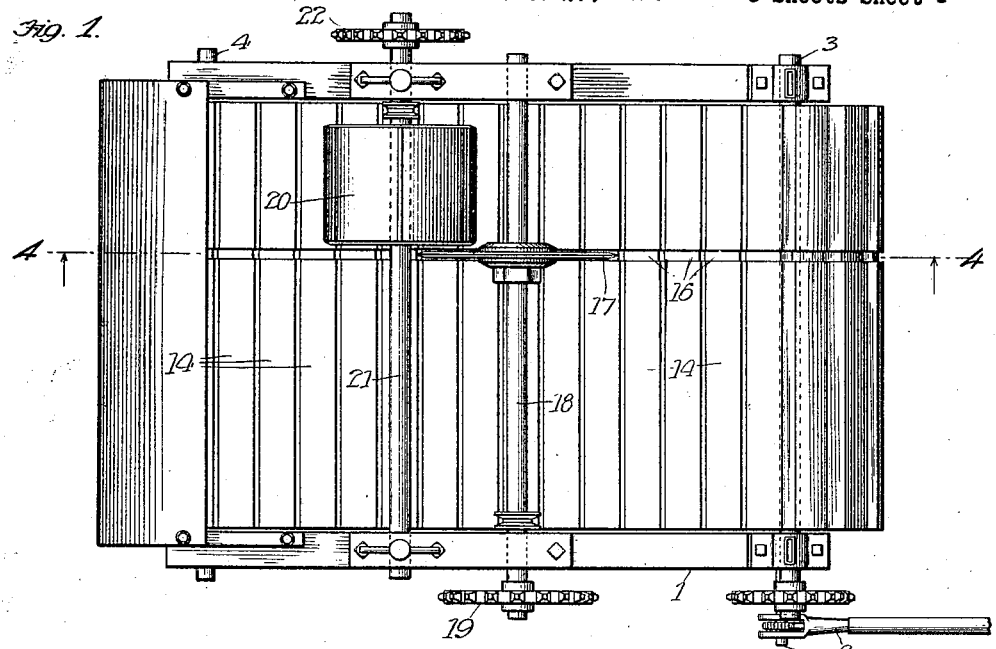

Figure 1 is a plan view.

Figure 2:
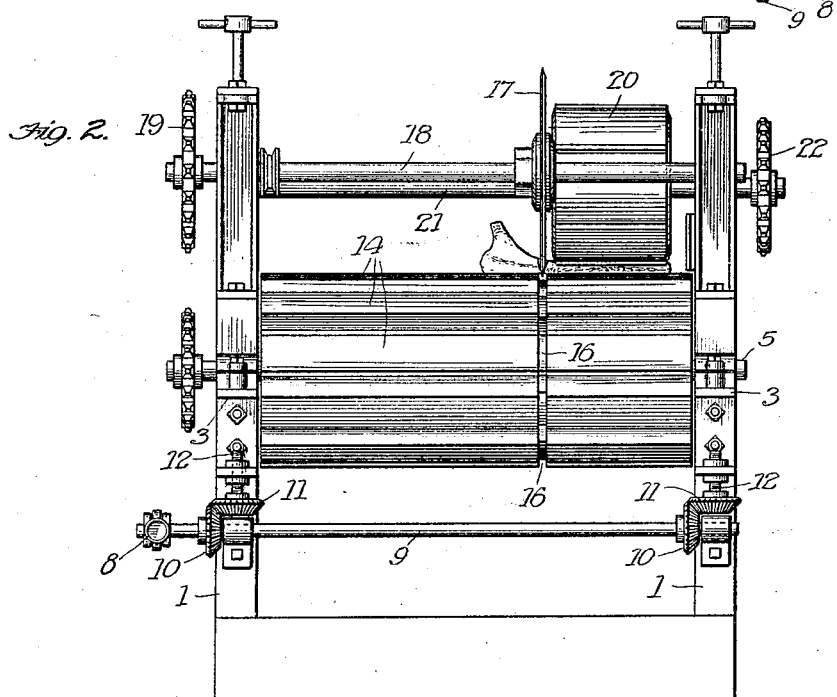

Fig. 2 a rear view.

Fig. 3 a side view.

Fig. 4 a longitudinal sectional view along the line 4—4 of Figure 1.

The main structural features of the machine are a supporting frame provided with bearings for the driving sprockets or pulleys through which power is applied to the operating parts of the machine, a conveyer drum at each end of the machine around which a belt continuously travels, the belt supporting at its surface a flight of transversely extending wooden blocks upon which the sides rest as they travel through the machine, suitable stationary supports for the conveyer between the driving drums, a pressing roller extending partway across the upper surface of the conveyer, and a rotary knife located at one side and slightly to the rear of the pressing roller. The knife extends into a longitudinally extending slot in the wood part of the conveyer, and the conveyer is adjustable vertically toward and away from the pressing roller and knife. The bearings of the pressing roller are vertically slidable in the frame of the machine against spring action to permit sides of varying thickness to pass between the roller and the conveyer and without being unduly pressed.

As numbered in the drawing, frame 1 is shown as supporting vertically adjustable brackets 2 and 3, which carry the bearings 4 and 5 for the conveyer drums 6 and 7. Vertical adjustment of the brackets for these bearings may be effected as by the ratchet mechanism 8 on the shaft 9, which shaft also carries the bevel pinions 10 meshing with pinions 11, which are fast to shafts 12, having threaded engagement with the brackets 3. By the vertical adjustment of the conveyer compensation is made for reduction in diameter of the knife from sharpening.

The belt 13 traveling around the drums 6 and 7 carries the transversely extending flight of wooden blocks 14, and this belt travels over a supporting top 15 movable vertically with the bearings for the conveyer. Each of the blocks 14 is grooved at 16, so that the rotary knife 17 may extend slightly below the upper supporting surface of the blocks on the belt.

The disk-shaped knife 17 is rigid on the transverse shaft 18, which is driven by a chain passing over sprocket 19 fast to this shaft. The pressing roller 20 is likewise secured to a transverse shaft 21 having the driving sprocket 22.

In the operation of the device the sides are so placed on the conveyer in advance of the pressing roller 20 that the belly part will be pressed by the roller, while the fat back extends along one side of the roller and the knife 17 which serves to separate the fat back from the belly. Substantially uniform results are effected by this machine, the cut always being straight and the bacon part of the sides being properly shaped. Also since with this machine there need be no danger of cracking the sides, a superior product is assured, while the amount of mechanical labor required in the old method is much reduced.

We claim:

A machine of the class described comprising a frame, a conveyer support, a conveyer arranged to travel over said conveyer support, a pressing roller mounted above said conveyer and arranged to cooperate therewith in pressing the sides of hogs traveling with said conveyer, and a disk-shaped knife at one side of said pressing roller for severing the fat back from the belly, means for driving said roller and said knife, and means for raising or lowering said conveyer and support for the purpose of changing its relation with said roller and knife.

Signed at So. St. Paul this 24th day of October, 1923.

CLINTON F. MacDONALD.
HARRY H. McKEE.